United States Patent
Schumann et al.

[19]

[11] Patent Number: 5,888,267
[45] Date of Patent: Mar. 30, 1999

[54] CHANNEL ARRANGEMENT FOR GLASS GOB TO A MOLD

[75] Inventors: Günter Schumann, Gelsenkirchen; Norbert Emrath, Haltern, both of Germany

[73] Assignee: GPS Glasproduktions-Service GmbH, Essen, Germany

[21] Appl. No.: 894,218

[22] PCT Filed: Jan. 4, 1996

[86] PCT No.: PCT/EP96/00017

§ 371 Date: Jul. 21, 1997

§ 102(e) Date: Jul. 21, 1997

[87] PCT Pub. No.: WO96/22253

PCT Pub. Date: Jul. 25, 1996

[30] Foreign Application Priority Data

Jan. 21, 1996 [DE] Germany ............... 195 01 762.5

[51] Int. Cl.$^6$ .............. C03B 7/14; C03B 9/16; C03B 9/20; C03B 5/26

[52] U.S. Cl. .............. 65/207; 65/225; 65/303; 65/304; 65/122; 65/127; 65/323

[58] Field of Search .............. 65/207, 225, 303, 65/304, 122, 126, 127, 323

[56] References Cited

U.S. PATENT DOCUMENTS

| | | | |
|---|---|---|---|
| 1,331,511 | 2/1920 | La France | 65/304 |
| 1,331,536 | 2/1920 | Soubier | 65/304 |
| 1,645,221 | 10/1927 | Barker, Jr. | 65/304 |
| 1,653,479 | 12/1927 | Soubier | 65/304 |
| 1,692,553 | 11/1928 | La france | 65/304 |
| 2,147,307 | 2/1939 | McNamara et al. | 65/304 |
| 2,293,860 | 8/1942 | Sloan | 65/304 |
| 2,334,064 | 11/1943 | Brown et al. | 65/304 |
| 2,758,421 | 8/1956 | Smith | 65/304 |
| 2,873,555 | 2/1959 | Conrad | 65/304 |
| 3,198,616 | 8/1965 | Havens | 65/304 |
| 3,198,617 | 8/1965 | Denman et al. | 65/304 |
| 5,599,370 | 2/1997 | Struckmeier et al. | 65/207 |

FOREIGN PATENT DOCUMENTS

| | | |
|---|---|---|
| 480642 | 4/1992 | European Pat. Off. . |
| 2193792 | 2/1974 | France . |
| 1-133945 | 5/1989 | Japan . |

*Primary Examiner*—James Derrington
*Assistant Examiner*—Jacqueline A. Ruller
*Attorney, Agent, or Firm*—Herbert Dubno; Andrew Wilford

[57] ABSTRACT

A gob distributor has an outlet from which issues a gob that is fed via a channel arrangement to a mold having an upwardly open inlet mouth. The channel arrangement has a central trough having an inlet adjacent and aligned with the distributor outlet and an outlet. This central trough extends downward from its inlet to its outlet. A deflecting trough has a generally straight upstream portion with an upper inlet aligned with the central-trough outlet and a downwardly directed lower outlet centered on a generally vertical axis and an upright downstream portion having a funnel-shaped and downwardly tapering passage also centered on the generally vertical axis and having an upper upstream end aligned with the upstream-portion outlet and a lower downstream end aligned with the mold mouth. An adjuster is connected to a hanger for displacing the downstream portion relative to the upstream portion to align the downstream-portion downstream end exactly with the mold mouth.

5 Claims, 2 Drawing Sheets

CHANNEL ARRANGEMENT FOR GLASS GOB TO A MOLD

CROSS REFERENCE TO RELATED APPLICATIONS

This application is the US national phase of PCT application PCT/EP96/00017 filed 4 Jan. 1996 with a claim to the priority of German application 195 01 762.5 itself filed 27 Jan. 1995.

FIELD OF THE INVENTION

The invention relates to a channel arrangement for conveying a glass gob from a gob distributor to a mold of a glass machine with a central trough whose inlet is connected to an inlet trough of the gob distributor and which is inclined downward from its inlet to its outlet and a deflecting trough whose inlet is connected to the outlet of the central trough and whose outlet end is generally straight and which is held so by means of an adjustable hanger on a frame part of the glass machine that the position of its outlet can be aligned with the central axis of the mold of the glass machine.

BACKGROUND OF THE INVENTION

With known such channel arrangements the smoothest possible conveying of the glass gob from the deflecting trough into the mold is sought in that the outlet of the deflecting trough is movable with the latter so that it can be brought into alignment with the central axis of the mold. As a result of the movability of the deflecting trough relative to the mold, deviations between the central axis of the outlet end of the deflecting trough and the central axis of the mold occur readily. They result in quality problems in the glass article made from the glass gob.

OBJECT OF THE INVENTION

It is an object of the invention to improve the described channel arrangement for conveying a glass gob from a gob distributor into a mold of a glass machine such that an exactly centered transfer of the glass gob from the deflecting trough of the channel arrangement is possible into the mold of the glass machine.

SUMMARY OF THE INVENTION

This object is solved according to the invention in that the outlet end of the deflecting trough is separate therefrom and is formed as a funnel. This funnel-shaped outlet end of the deflecting trough is held fixedly relative to the mold. The remaining part of the deflecting trough is made movable relative to the funnel which tapers toward the mold. As a result of its movability the central axis of the outlet region of the deflecting trough is always aligned with the central axis of the funnel or of the mold. Small deviations between the central axis of the outlet of the deflecting groove and the central axis of the funnel are eliminated by the funnel effect so that the glass gob leaves the end exactly aligned with the central axis of the funnel-shaped end fixed relative to the mold. Since this central axis is always aligned with the central axis of the mold as a result of being fixed spatially relative to the mold, the glass gob moves exactly in the desired direction into the mold. As a result there is an ideal distribution of the glass material present inside the glass gob inside the mold. In addition the end formed according to the invention insures that the glass gob is not deformed or is only slightly deformed.

An exact alignment of the central axis of the funnel-shaped separate outlet end of the deflecting trough with the central axis of the mold is achieved in a simple manner when the outlet end of the deflecting trough is held by a hanger and is adjustable on the hanger by means of two adjusters in two directions perpendicular to each other and to the central axis of the end.

To exchange the separate outlet ends it is preferable when the above-mentioned hanger is arranged on a slide that moves along a rail. In this manner for example changing of the funnel-shaped outlet end of the deflector trough is possible.

A transfer between the central trough of the channel arrangement and its deflecting trough with minimal problems and a transfer minimally impacting the quality of the glass gob is possible when the outlet of the central trough and of the inlet of the deflecting trough are interconnected by means of a connecting traverse between which and the outlet of the central trough is a ball-type swivel mount. In this manner with any movement of the deflecting trough there is a corresponding adjustment of the outlet of the central trough so that a troublefree transfer of the glass gob from the outlet of the central trough into the inlet of the deflecting trough is insured.

The most precise alignment of the central axis of the outlet end of the remaining deflecting trough is achieved when the hanger of the deflecting trough is connected to the frame part of the glass machine by means of a link adjustable in three mutually perpendicular directions. In this manner the demands on the glass gob in the remaining portion of the deflecting trough are further minimized relative to the funnel-shaped end portion fixed relative to the mold.

BRIEF DESCRIPTION OF THE DRAWING

The invention is more closely described in the following with reference to an embodiment while referring to the drawing. Therein.

SPECIFIC DESCRIPTION

Figure 1:
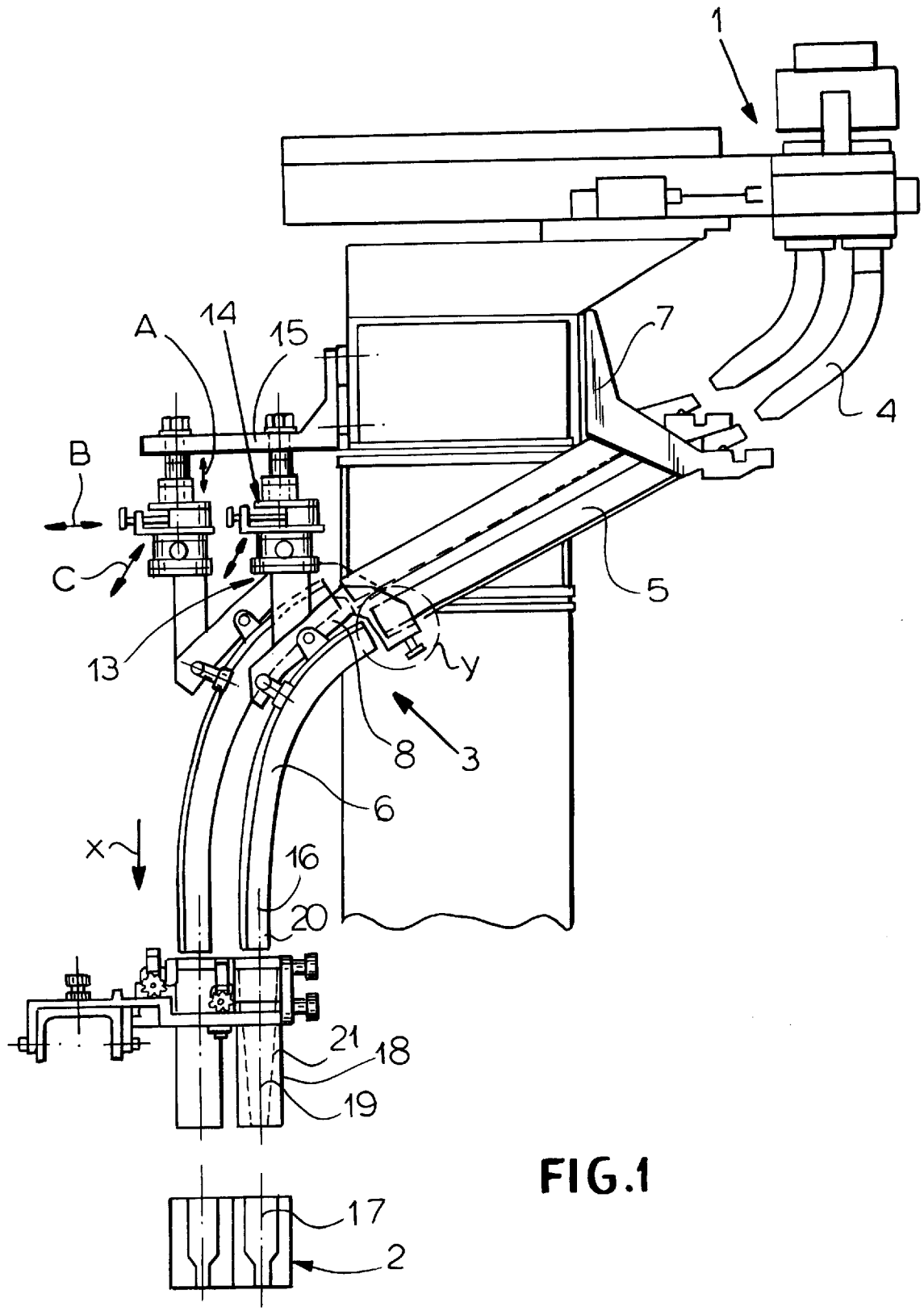
FIG. 1 is an illustration of a channel arrangement according to the invention.

A channel arrangement shown in FIG. 1 serves for conveying a glass gob not shown in the figures from a gob distributor 1 of a glass machine to a mold 2 of the glass machine. In FIG. 1 two such channel arrangements 3 are shown of which, since they are identical in function and construction, only one is described in detail.

To convey the glass gob from the gob distributor 1 into the channel arrangement 3 the gob distributor 1 has an input trough 4. The input trough 4, which is curved so that it initially is vertical and then extends at an angle downward, is followed by the channel arrangement 3.

The channel arrangement 3 has a central trough 5 and a deflecting trough 6. The input of the central trough 5 is aligned with the outlet of the input trough 4 of the gob distributor whose outlet is aligned with the input of the deflecting trough 6, and the output of the deflecting trough 6 is aligned with the input of the mold 2.

The central trough 5 is generally straight and extends generally in the same direction as the output end of the input trough 4 of the gob distributor 1. Near its input the central trough 5 is mounted for pivoting on a support arm 7 fixed on the frame of the glass machine. As a result of the alignment of the central trough 5 and the output end of the input trough 4 of the gob distributor 1 a uniform and substantially undisturbed transfer of the glass gob from the input trough 4 of the gob distributor 1 into the central trough 5 of the channel arrangement 3 is ensured.

Figure 2:
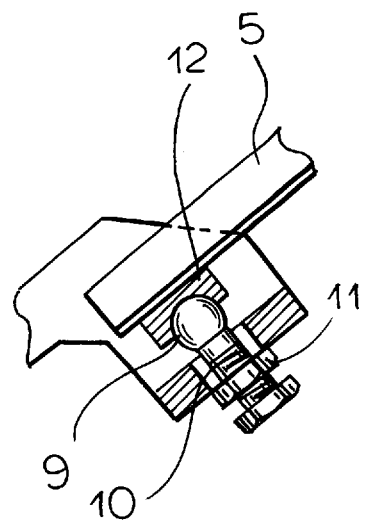
FIG. 2 is an enlarged view of the detail indicated at Y in FIG. 1.

The output side of the central trough 5 is supported by means of a connecting traverse 8 between the output of the central trough 5 and the input of the deflecting trough 6. The connecting traverse 8 is thus connected with the output of the central trough 5 as well as with the input of the deflecting trough 6. A ball swivel joint 9 shown in FIG. 2 is provided to interconnect the connecting traverse 8 and the output of the central trough 5 at the corresponding pivot section of the connecting traverse 8. Its ball is on the free end of a threaded bolt 10 screwed into the connecting traverse 8. For adjustment and locking of the threaded bolt 10 on the connecting traverse 8 the latter is provided with a fixedly mounted nut 11.

Sitting on the central trough end of the ball head 9 mounted on the threaded bolt 10 is a bearing part 12 having a semispherical seat and mounted on the underside of the outputside end of the central trough 5. Thus movement of the deflecting trough 6 and thus of the connecting traverse 8 connected to it can on the one hand be compensated for by the pivotal mounting of the central trough 5 on the support arm 7 and by the threedimensional mounting of the bearing part 12 on the ball head 9. Thus regardless of the spatial orientation of the deflecting trough 6 relative to the central trough 5 as a result of a corresponding movement of the central trough 5 there is a uniform and trouble-free transfer of the glass gob from the output of the central trough 5 to the input of the deflecting trough 6.

The connecting traverse 8 mounted on the input end of the deflecting trough 6 is held by a hanger 13 which is connected via a coupling 14 with a frame part 15 fixed on the frame of the glass machine.

The coupling 14 allows movement of the input end of the deflecting trough 6 in the vertical direction shown by arrow A, in the horizontal direction shown by arrow B, and in the direction shown by the arrow C transverse to the horizontal direction. Thus it is possible because of the coupling 14 to position the deflecting trough 6 such that the central axis 16 of its outlet is generally aligned with the central axis 17 of the mold 2.

Since an absolutely perfect alignment between the central axis 16 of the outlet of the deflecting tough 6 and the central axis 17 of the mold 2 of the glass machine is impossible or is only possible with very precise adjustment of the coupling 14 or a very expensive construction of this coupling 14, the outlet end of the deflecting trough 6 is separate from the rest of the deflecting trough 6.

The outlet end 18 is fixed in place relative to the mold 2. It is thus possible for the central axis 19 of the outlet end 18 to be perfectly aligned with the central axis 17 of the mold 2 so that an exactly centered transfer of the unil lustrated glass gob is possible from the outlet end 18 into the mold 2.

To compensate for slight deviations in the orientation of the central axis 16 of the remaining portion of the outlet 20 at the deflecting trough from the outlet end 18 separate from the deflecting trough 6, the outlet end 18 is provided with a funnel 21 which is shown in the figure in dashed lines and which tapers between the inlet of the outlet end 18 and the outlet of same. This insures that under any circumstances the glass gob transferred from the outlet 20 of the other part of the deflecting trough 6 into the outlet end 18 which is separate from the deflecting trough 6 moves at the outlet 20 of the outlet end 18 provided with the funnel 21 in exact alignment with the central axis 17 of the mold 2 of the glass machine. In this manner one obtains the already described advantages in the production of a glass article from the glass gob.

Figure 3:
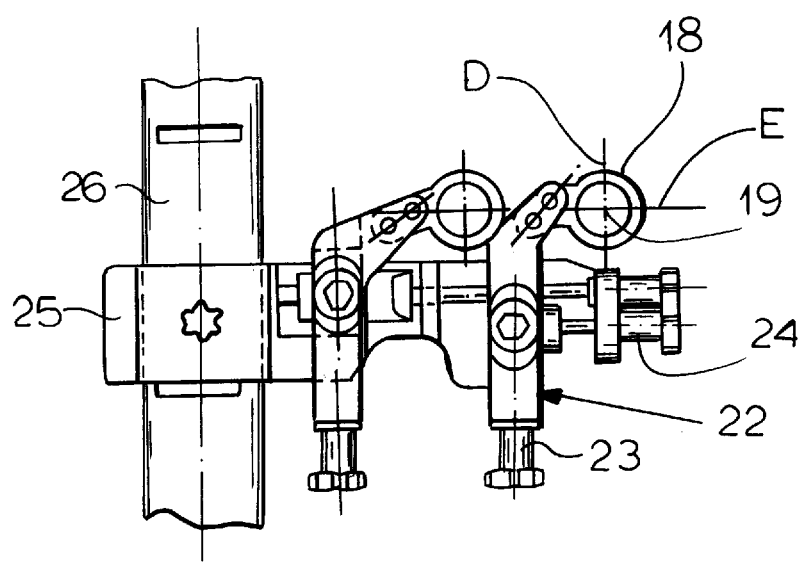
FIG. 3 is a top view in the direction x of FIG. 1 on a hanger for the channel arrangement according to the invention.

The outlet end 18 provided with the funnel 21 is held in a hanger 22 which has two adjusters 23 and 24 by means of which the position of the outlet end 18 can be adjusted both in the direction D of FIG. 3 as well as in the direction E also shown in FIG. 3 to the position of the mold. 2 of the glass machine. In this manner it is possible to achieve an exact alignment between the central axis 19 of the outlet end 18 and the central axis 17 of the mold 2. The directions D and E extend perpendicular to each other and to the vertical central axis 19 of the outlet end 18.

The hanger 22 of the outlet end 18 is itself connected with a slide 25 which moves on a rail 26. In this manner it is relatively inexpensive to exchange the outlet end 18 with another that for example is better adapted to the also changed mold.

What claim:

1. In combination with a gob distributor having an outlet from which issues a gob and with a mold having an upwardly open inlet mouth, a channel arrangement comprising:

a central trough having an inlet adjacent and aligned with the distributor outlet and an outlet, the central trough extending downward from its inlet to its outlet;

a deflecting trough having
a generally straight upstream portion with an upper inlet aligned with the central-trough outlet and a downwardly directed lower outlet centered on a generally vertical axis and
a separate upright downstream portion having a funnel-shaped and downwardly tapering passage also centered on the generally vertical axis and having an upper end aligned with the upstream-portion outlet and a lower end aligned with the mold mouth; and means including a hanger for displacing the downstream portion relative to the upstream portion to align the downstream-portion lower, end exactly with the mold mouth.

2. The channel arrangement defined in claim 1 wherein the means includes a pair of adjusters effective on the downstream portion in respective generally perpendicular horizontal directions.

3. The channel arrangement defined in claim 1 wherein the means includes a generally stationary rail and a slide releasably mounted on the rail and carrying the hanger.

4. The channel arrangement defined in claim 1, further comprising a connecting traverse connected to the deflecting-trough inlet; and a swivel mount on the traverse carrying the central-trough outlet.

5. The channel arrangement defined in claim 1, further comprising:

a stationary glass-machine frame; and a coupling adjustable in three mutually perpendicular directions and carrying the hanger on the frame.

* * * * *